US011430465B2

(12) United States Patent
Thompson

(10) Patent No.: US 11,430,465 B2
(45) Date of Patent: Aug. 30, 2022

(54) ANSWER MACHINE DETECTION METHOD AND APPARATUS

(71) Applicant: Magus Communications Limited, London (GB)

(72) Inventor: Michael Thompson, Devon (GB)

(73) Assignee: Magus Communications Limited, London (GB)

(*) Notice: Subject to any disclaimer, the term of this patent is extended or adjusted under 35 U.S.C. 154(b) by 115 days.

(21) Appl. No.: 16/431,250

(22) Filed: Jun. 4, 2019

(65) Prior Publication Data

US 2019/0392857 A1 Dec. 26, 2019

(51) Int. Cl.
*G10L 25/51* (2013.01)
*G06F 16/63* (2019.01)
(Continued)

(52) U.S. Cl.
CPC .............. *G10L 25/51* (2013.01); *G06F 16/63* (2019.01); *G10L 15/22* (2013.01); *G10L 15/30* (2013.01);
(Continued)

(58) Field of Classification Search
CPC ....... G10L 19/018; G10L 25/51; G10L 25/78; G10L 15/22; G10L 15/30; H04M 3/2218; H04M 3/22; H04M 3/50; H04M 3/53; H04M 3/5307; H04M 3/5322; H04M 3/487; H04M 3/537; H04M 3/5158; H04M 3/382; H04M 3/42025; H04M 3/42034; H04M 3/42085; G06F 16/63; G06F 16/683; G06F 31/31; G06F 21/33; G06F 3/16; G06F 3/162; G06F 3/165; G06F 3/167;
(Continued)

(56) References Cited

U.S. PATENT DOCUMENTS

| 6,208,970 B1 | 3/2001 | Ramanan |
| 8,681,950 B2 | 3/2014 | Vlack et al. |

(Continued)

FOREIGN PATENT DOCUMENTS

| EP | 1 134 960 A2 | 9/2001 |
| GB | 2 293 723 A | 4/1996 |

(Continued)

OTHER PUBLICATIONS

Jaap et al., "A Highly Robust Audio Fingerprinting System", http://ismir2002.ircam.fr/proceedings/02-FP04-2.pdf, pp. 1-9 (Year: 2002).*
Search Report Under Section 17(5), dated Nov. 6, 2018, Application No. GB1810202.0, 4 pages.

(Continued)

*Primary Examiner* — Leshui Zhang
(74) *Attorney, Agent, or Firm* — Daly, Crowley, Mofford & Durkee, LLP

(57) ABSTRACT

A method of recorded message detection is provided. In this an audio restream is received and a set of landmark features is identified in a section of the audio stream. From these landmark features an audio finger print for the section of the audio stream is determined. This audio finger print is compared with at least one of the plurality of stored audio finger prints, each derived from a respective audio stream. It is determined that the received audio stream is a recorded message if a derived audio finger print is substantially equivalent to one of the plurality of stored audio finger prints representing a recorded message.

8 Claims, 7 Drawing Sheets

(51) Int. Cl.
*G10L 15/22* (2006.01)
*G10L 15/30* (2013.01)
*G10L 25/78* (2013.01)
*H04M 3/51* (2006.01)
*G06F 16/683* (2019.01)

(52) U.S. Cl.
CPC .......... *G10L 25/78* (2013.01); *H04M 3/5158* (2013.01); *H04M 2203/2027* (2013.01)

(58) Field of Classification Search
CPC ........ G06F 16/60; G06F 16/61; G06F 16/632; G06F 16/634; G06F 16/635; G06F 16/636; G06F 16/637; G06F 16/638; G06F 16/639; G06F 16/64; H04L 63/02; H04L 63/08; H04L 63/083; H04L 63/0869; H04L 63/101; H04L 63/14; G06Q 20/4014
USPC .............. 704/270, E19.009, 245; 379/88.01, 379/88.02, 88.04, 142.01, 142.03, 142.05, 379/142.06, 142.17, 245, 246, 247, 93.02, 379/100.05, 111, 112.01, 112.07, 112.08, 379/133, 134, 142.04, 196, 201.01, 379/201.02, 201.07, 201.08; 713/182, 713/183, 184; 726/2, 3, 5, 6, 7
See application file for complete search history.

(56) References Cited

U.S. PATENT DOCUMENTS

| | | |
|---|---|---|
| 9,596,578 B1 | 3/2017 | Clark et al. |
| 9,838,538 B1 | 12/2017 | Andraszek |
| 2002/0023020 A1* | 2/2002 | Kenyon .................. G10L 25/48 704/231 |
| 2002/0083060 A1* | 6/2002 | Wang ...................... G10L 17/26 |
| 2003/0081756 A1 | 5/2003 | Chan et al. |
| 2003/0191764 A1* | 10/2003 | Richards ............... G06F 16/634 |
| 2004/0132451 A1* | 7/2004 | Butehorn ........... H04B 7/18584 455/445 |
| 2006/0013451 A1* | 1/2006 | Haitsma .................. G06F 16/41 382/124 |
| 2006/0106867 A1* | 5/2006 | Burges .................... H04H 60/37 |
| 2013/0259211 A1* | 10/2013 | Vlack .................... G06F 16/683 379/88.01 |
| 2014/0369479 A1 | 12/2014 | Siminoff |
| 2019/0132298 A1* | 5/2019 | Roux ...................... G06F 21/44 |

FOREIGN PATENT DOCUMENTS

| | | |
|---|---|---|
| GB | 2487734 A | 8/2012 |
| WO | WO 2005/079499 A2 | 9/2005 |
| WO | WO 2006/086556 A2 | 8/2006 |
| WO | WO 2013/148069 A1 | 10/2013 |

OTHER PUBLICATIONS

Notification of Transmittal of the International Search Report and the Written Opinion of the ISA dated Oct. 1, 2019 for International Application No. PCT/GB2019/051704; 1 Page.
International Search Report dated Oct. 1, 2019 for International Application No. PCT/GB2019/051704; 6 Pages.
Written Opinion of the ISA dated Oct. 1, 2019 for International Application No. PCT/GB2019/051704; 6 Pages.

* cited by examiner

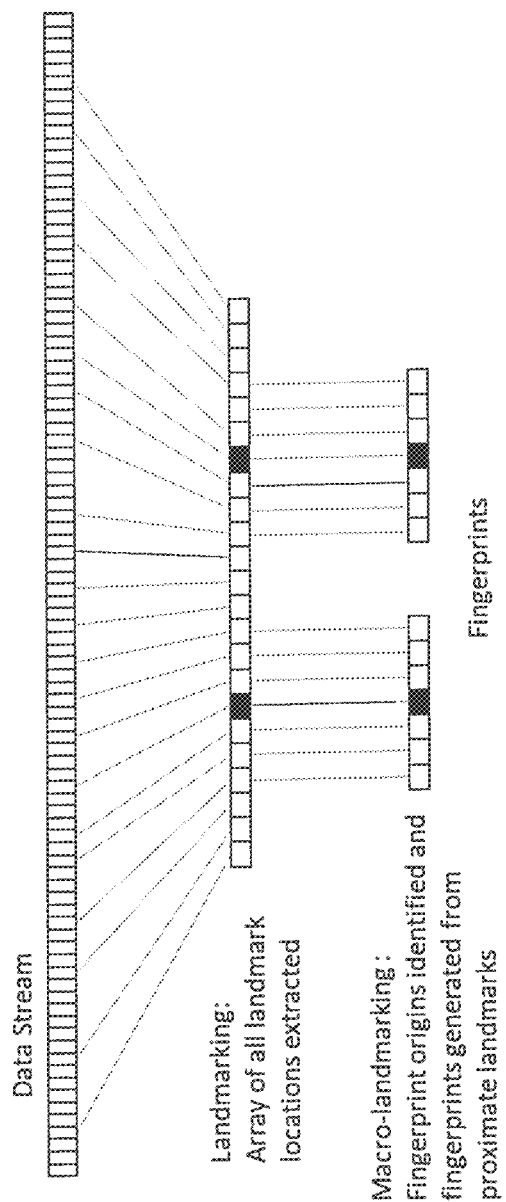

ANSWER MACHINE DETECTION METHOD AND APPARATUS

This application claims priority to United Kingdom application GB1810202.0 filed Jun. 21, 2018 entitled ANSWER MACHINE DETECTION METHOD & APPARATUS which application is incorporated herein by reference.

The present invention relates to the detection of recorded audio over a digital telephony network, and in particular to the identification of recorded messages immediately following the connection of a call. This is commonly known as Answer Machine Detection (AMD).

BACKGROUND OF INVENTION

For most companies, telephony communication with their customers is vital in support of sales, market research, post-sales support, or other supplementary services. Companies may therefore outsource their telephony based processes to dedicated call centres.

With the advent of computing and digital telephony equipment, call centres have been able to utilise systems and applications to automatically dial and transfer calls to waiting agents. On connection of a call answered by a consumer, it is vital that the call is connected to an agent, and connected quickly. Delays connecting to an agent, or dropping the call before connecting to an agent, have been recognised as a consumer nuisance, and many national regulations impose heavy fines to limit this.

A predictive dialer provides efficiency increases by intelligently compensating for call failures. Predicting the percentage of calls which will not be connected to a live consumer can allow the telephony system to over-dial. That is, dial more telephone numbers than there are agents waiting to connect to a call.

Automated answer machine detection (AMD) can be used to identify recorded announcements. Efficiency gains in automated dialing systems can be made in two ways using AMD. Firstly, voice mail calls can be prevented from being connected to agents thus saving agents from wasting time on these calls. Secondly, as these calls can be deemed failures, their proportion can be factored into the failure rate and may allow the predictive dialer to increase its over-dial rate accordingly.

A problem with automated answer machine detection (AMD) is false identification. This falls into two categories:

False negatives are where an AMD mechanism cannot identify a recorded message as a recorded message. In this case, the mechanism defaults to "live caller", and connects an agent to the recorded message. This is inconvenient for the agent and inefficient for the call centre, and it is desirable to reduce these occurrences.

False positives are where an AMD mechanism falsely identifies a live caller as a recorded message. This leads to a call being dropped when a live caller has answered, and is more serious, as such occurrences are in some regions heavily regulated and breaches of regulation may result in fines. It is therefore desirable to reduce these occurrences.

Earlier AMD mechanisms were commonly based on the power level patterns (cadence) of the call's initial audio signal. This technique is highly susceptible to false positives and so has been more recently succeeded by techniques that are designed to reduce and eliminate false positives. Cadence detection also typically takes 2 seconds to determine the callee type. This is well within human response times and is discernible by a live callee, thus indicating the origin of a call as an automated dialer.

Capture-compare automated answer machine detection (AMD) uses a method of capturing audio from a source, such as a call to a telephone number and comparing it to previously captured recordings from previous telephone calls. If a match is found between a segment of captured audio and a segment of previously recorded audio then the AMD system has heard the message before, and thus it an answer machine is detected, and the call should not be transferred to an agent. The capture and compare method relies on the audio being received substantially free from error and distortion, so that a comparison can be made with previously recorded audio. It also relies on the extreme improbability of a call answered by a human producing a match to a recorded audio stream. Usually there are several recorded segments from the same captured recording with which a newly received segment is compared. This is computationally intensive as the recorded segments and newly received segment each contain a significant amount of data which results in a relatively heavy processing load in order to determine whether the newly received segment matches any recorded segment.

Previously, raw audio data has been recorded and stored in a database to act as a library with which to compare live audio calls. Raw audio data is then received during the call and approximately 10 millisecond samples are compared to the samples in the database. An example of such a system is shown in GB2487734. Using raw audio data leaves the audio samples vulnerable to companding, conversion, gain and bias alterations and the like which may occur in transmission or copying of the audio sample. If the candidate audio call sample and the stored sample have undergone different operations during transmission, then a match may not be possible. This leads to a higher rate of false negatives i.e. connection of a call to an agent when the call has been answered by an answering machine.

Other fingerprint based matching techniques have used frequency analysis to generate fingerprints. For example, in WO 2013/148069 fingerprints are based on a spectral analysis of the audio. This uses regions of dense frequency energy in the spectrogram to create a bit-vector fingerprint. This requires at least 250 milliseconds of audio data to generate a fingerprint distinct enough to achieve a reliable match. The spectral analysis requires many iterations of the same computation to render these semantic fingerprint.

The present invention therefore seeks to provide an answer machine detection system which is able to produce a more accurate rate of AMD whilst being faster and computationally less intensive than prior art systems.

SUMMARY OF INVENTION

Preferred embodiments of the present invention provide a method and apparatus which identify features, or landmarks, defined by linear analysis of the actual data values making up an audio stream, and use these to provide a fingerprint. This analysis can be done directly on an incoming audio stream and then compared with one or more stored fingerprint or unique sequences or patterns of features.

Thus preferred embodiments of the present invention identify landmark features in a received audio stream and derive a fingerprint from those landmark features for comparison with one or more stored fingerprints derived from recorded messages.

Preferably the landmark features are well defined locations in the audio stream and the fingerprint comprises the relative locations of the landmarks detected within a sample of the audio signal.

Preferably an embodiment identifies one or more 'macro landmarks' representing one or more origins for the fingerprint comparison. These macro landmarks may be determined from the initially determined landmarks.

Such an approach results in fingerprints that require fewer comparisons to be made with stored fingerprint, and thus a more computationally efficient comparison with a stored fingerprint library can be made. As a consequence, the fingerprint library can be larger and more comprehensive leading to a greater chance of positive detection (when possible) and a more accurate AMD mechanism.

The invention is defined in its various aspects with more precision in the appended claims to which reference should now be made.

BRIEF DESCRIPTION OF THE DRAWINGS

FIG. 7 shows schematically the derivation of landmark data from an audio data stream as may be used in embodiments of the invention.

DETAILED DESCRIPTION OF EMBODIMENTS

According to an embodiment of the invention, there is provided an answer machine detection system which uses a landmarking algorithm to generate 'agnostic' fingerprints related to an audio stream.

A telephone call is made by a computer or computer system in an automated dialing system. The computer may also simultaneously place a number of other calls. When a call is answered an AMD device attempts to determine whether a live caller has answered the telephone call, or whether voice mail has been reached, so that the call can either be passed to an agent if it is a live caller, or dropped if it is voice mail.

When a telephone call is connected, and audio is detected at the destination end, the AMD device inside or connected to the computer performs answer machine detection.

The digital audio signal of the telephone call comprises a sequenced 1 dimensional array, or steam, of sample values, which are sampled at a known sample rate at discrete points in time in the signal. The audio can be plotted with amplitude or power as the ordinate, and time as the abscissa, with a discrete number of points corresponding to the number of samples taken. For instance, sampled at 5 kHz, a 20 millisecond segment of an audio stream would comprise 100 points. The samples each have a linear or logarithmic value associated with them, relating to the amplitude or power of the audio signal at that point.

Figure 1:
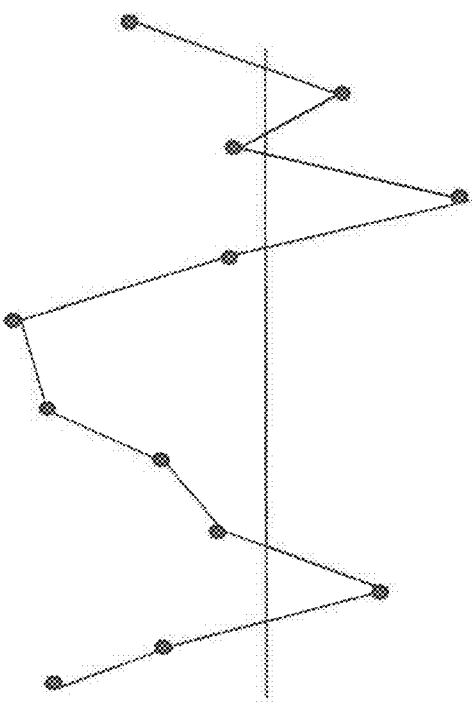
FIG. 1 is an illustration of a comparison between an actual waveform and a sampled waveform
Figure 1:
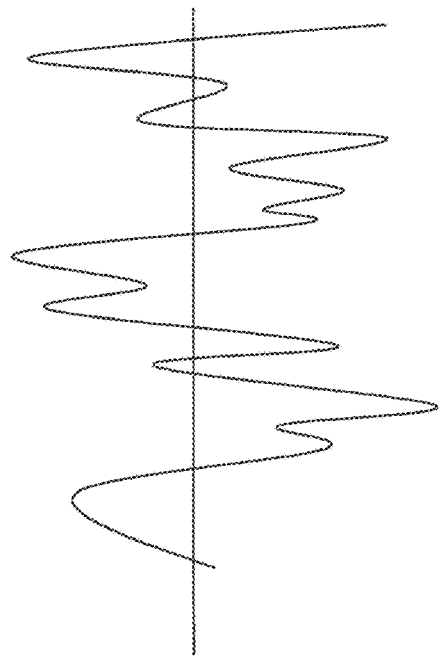

The sampled points define a quantized waveform or line graph, representing the audio (FIG. 1). This waveform will have a number of distinctive graphical features, similar to a continuous waveform, such as peaks, troughs, points of maximum gradient, etc. These identifiable points may also be referred to as points of interest, or graphical landmarks. These are used in embodiments of the present invention as the landmark features of the audio steam. Where a received audio stream contains a recorded message, the uinique pattern or sequence of landmark points will be substantially the same each time the message is received and will represent a unique fingerprint for that recorded message. With a human voice the unique pattern or sequence of landmark points will be different each time the received audio stream is received, as humans cannot repeat the same greeting in the exact same way to the level of digitally sampled equivalence. Indeed, each human greeting may use different intonations, cadences, speeds and even words when answering a telephone call.

It is impossible for a human to recreate a greeting in such a manner as to provide identical fingerprints. Each time a human says a greeting, the audio recorded is slightly different. This being so, the landmark fingerprinting operations cannot generate false positives.

The landmark features of the received audio stream are used to generate fingerprints from the audio stream. A fingerprint is derived from a pattern or sequence of landmark points from the audio stream. The fingerprint is principally derived from the type of landmark and relative location of the landmarks. It does not contain any sample values at or near landmark points, thus making any derived fingerprints independent of any codec translation that may alter the sample values.

The fingerprint can therefore, for example, be derived from a series of points of inflection (peaks, troughs), and gradient maxima, etc, or any combination of such graphical points of interest. There is no constructive content information about the audio stream itself contained in the fingerprint i.e. no information which enables the audio stream to be reconstructed, and the fingerprint can therefore be considered to be agnostic of the audio data from which it was derived. The algorithm could be applied to any type data stream agnostic of its semantic content, in order to isolate unique fingerprints.

It should be noted that other digital audio matching mechanisms use a form of landmarking, however it is radically different from the use or nation of landmarking within this invention. In the music copyright infringement detection, an audio stream may be sampled, and fingerprints generated from it. In some cases, a fingerprint may be generated at a semantic landmark within the content of the stream, such as a volume step change or other semantic feature. In such an application the landmark indicates high level area at or around which a fingerprint may be generated. Importantly, audio copyright infringement fingerprints are not derived from graphical landmarks within the ordered data array of the audio stream, as they are in this invention. Typically, such applications as audio copyright infringement use multi-pass frequency analysis to generate fingerprints.

FIG. 1 shows a comparison between an audio waveform and a sampled audio waveform. In a sampled version of a waveform shown at 1(b) discrete sample points are connected in a line graph. Points of inflection (peaks and troughs) may be easily identified and associated with individual sample points.

In one embodiment of this invention, to generate a fingerprint the audio stream is first analysed to detect the points of inflection in the audio waveform. These are points in the waveform where the surrounding amplitude points on both sides of the identified point are both lower in the case of a peak or both higher in the case of a trough.

To identify these points of inflection, the sampled points are stepped through in sequence and a comparison made with the amplitude of a preceding point or points. Where a sample point has a greater amplitude than the points on either side of it, it is a peak, and where it is lower than the points on either side of it then it is a trough.

Figure 2:
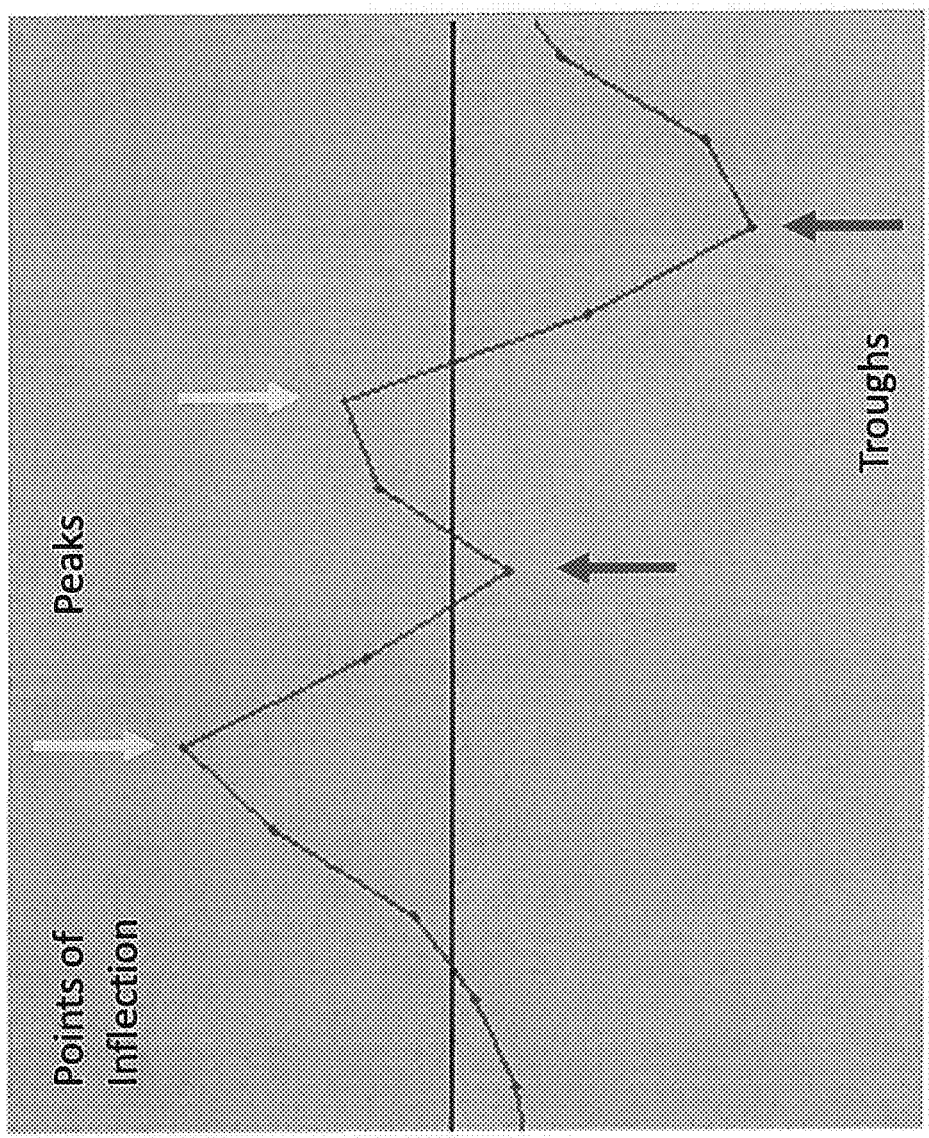
FIG. 2 shows in more detail how further detail on the derivation of landmark features in a sampled data stream.

FIG. 2 shows instances of points of inflection in the digitised wave form, where a peak landmark is identified as single point at which a sequence of increasing sample values changes to a sequence of decreasing values, and a trough landmark is identified as single point at which a sequence of decreasing sample values changes to a sequence of increasing values.

Between storage of an audio recording file and reception of a corresponding audio stream the data may undergo some encoding transposition: alteration of sample values. This can occur at the point of transmission, within a transit node or at the point of reception. Audio streams that originate from the same recording may undergo different encoding transposition. The same audio recording may be transmitted from different locations or may transit over different routes within the public network. This means that transmission of the same original recording may not retain digital equivalence over multiple receptions at a single destination.

The nature of the translation is usually to multiply all sample values (gain change) or to reduce the quantized range of sample value, through compression. While the absolute sample values may change the relative values remain similar. As landmarks are based on value trends rather than absolute values, landmarks can be persistent over encoding translation such as gain or compression. Hence, basing fingerprints on landmarks rather than raw sample values is much more reliable for AMD.

However, there are some cases, especially when compression occurs where relative values are not retained. In such cases landmarks my become less pronounced or even "flattened". It is for this reason that the present invention applies a filter on the identified landmarks before they are rendered into the fingerprints. The filter seeks to remove landmarks that may not be persistent over codec changes. This filter removes weak landmarks and retains strong landmarks.

Thus, at the same time as identifying points of inflection in the audio stream, information about the waveform immediately surrounding the points is identified. This information allows the fingerprint generator to determine whether a peak or a trough is present and whether it is a 'strong' landmark.

Figure 3:
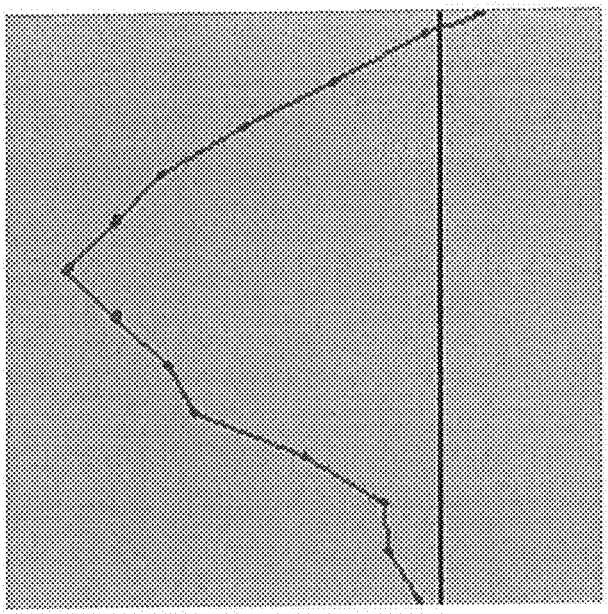
FIG. 3 illustrates why some landmark features are weak rather than strong.
Figure 3:
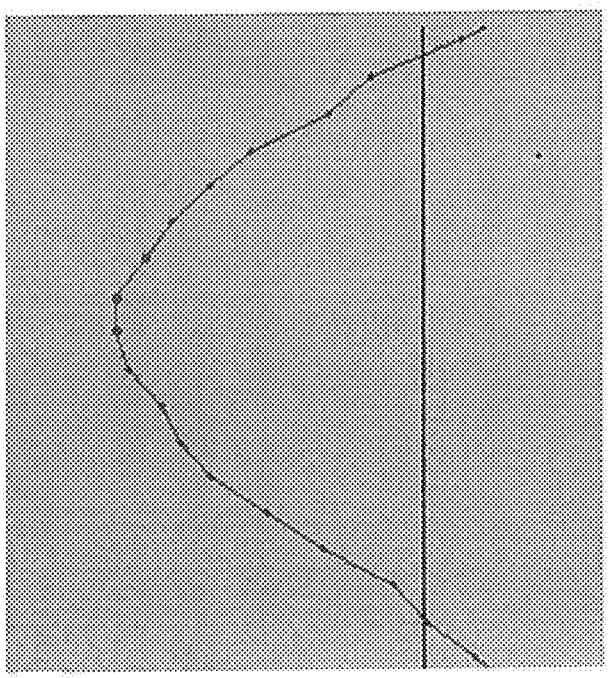

FIG. 3 contains 2 example peaks (a) and (b). The amplitudes of the audio stream samples defining the audio signal, in the immediate vicinity of the peaks, in this example are as follows:

| a | 0xABC1 | 0xABC6 | 0xAB99 |
| b | 0xABC1 | 0xAF46 | 0xABC9 |

In both examples the middle value is the identified peak; that is, the signal increases in amplitude towards the middle point, and decreases afterwards. An unfiltered analysis will accept both of these points as candidates for landmark points. This analysis comprises the system stepping through the samples and comparing the magnitude of each sample with the previous and following sample to determine whether there is a change from a positive to a negative difference, or vice versa, which will indicate that a sample point is a peak or a trough.

FIG. 3 shows that some landmark points identified by this method may be well defined and therefore strong landmarks, and others less well defined and therefore weak landmarks. In FIG. 3(a) the values defining the peak are close in value. If the stream undergoes compression from 16-bit to 8-bit as shown in the table in 3(a) then two adjacent points acquire the same value. This equivalence is retained on uncompressing back to 16-bit. Effectively the peak has been flattened. This landmark is no longer there; it is not persistent.

For 3(b), even though the sample values of the three points are changed after compressing/uncompressing, the difference in the values is still large and the peak landmark persists. This is a strong landmark.

| $a_{(2)}$ | 0xABC0 | 0xABC0 | 0xAB90 |
| $b_{(2)}$ | 0xABC0 | 0xAF40 | 0xABC0 |

If we consider 2 transmissions of a digital voice mail message containing both peaks a) and b). If the first transmission undergoes no compression, then at the point of reception, both peak a) and b) can be identified as landmarks. If a second transmission of the same message transits a route in the network that compresses the stream then at the point of reception, only b) can be identified as landmarks. Thus, weak landmarks similar to point a) are not included in fingerprints generation as they reduce or eliminate the possibility of a match with fingerprints generated from the same message.

Should the transmissions occur in the reverse order with compression occurring in the first transmission, the result will be the same. In the first transmission peak a) will not be regarded as a landmark, and in the second, uncompressed transmission it will be dismissed as a weak landmark. The result will be that only peak b) will be regarded as a strong landmark in both transmissions.

To identify such strong landmarks (more distinct points of inflection resistant to companding or sample rate distortions), further analysis of the sample points is needed. In the case of peak a), the comparison with amplitudes of adjacent points produces a relatively small difference as the peak is not particularly distinct. In the case of peak b), the comparison with amplitudes of adjacent points is relatively high, as the gradient of the waveform in that area is steeper on either side of the sample point and the peak is more distinct. The filter threshold is set so that dearly distinct and therefore persistent landmarks are regarded as candidates for fingerprint generation.

The threshold for a point of inflection to be considered as sufficiently strong to be included in a fingerprint may be formed as an absolute or scalar difference in amplitude between points adjacent to the point of inflection, or a combination of absolute and scalar differences. This may be extended to the next adjacent points to ensure that the point of inflection is sufficiently distinct and that a small difference in time sampling does not cause a different point to be determined as a point of inflection. Such a filter may optionally dictate that for a point of inflection to define a strong landmark it must be preceded by two or more samples of increasing value, and followed by two or more samples of decreasing value. The complement would apply to a trough that defines a strong landmark.

Further filters may be applied based on the absolute power of the sample at any landmark or on the power relative to the rest of the audio. This can ensure that fingerprints are derived from parts of the audio stream containing speech, and not during pauses.

Each landmark is associated with a single sample value and therefore to a given time point location in the audio stream. The absolute location is not persistent over multiple transmissions of a calls audio steam, as call connection signalling and audio stream commencement are not reliably synchronised. However, the relative time between landmark features within the stream is persistent.

The fingerprint is created from the graphical landmark features in the audio steam. The identified strong landmarks are rendered into the fingerprint as a set of relative time separation gaps (deltas) between points. They can also be stored as a sequence of landmark type indicators (typically peak or trough). They can also be stored as a sequence both time separations and landmark type indicators. This 1 or 2-dimensional set of landmark points is the fingerprint.

The AMD described by this invention relies on generating fingerprints from audio streams and finding matching fingerprints from the same original message. To do this, a match must be made on equivalent sized sets of landmarks. This can be done by either deriving the fingerprints from a fixed sized set of landmarks, or deriving a fingerprint from an unlimited set of landmarks, but limiting the comparison operation to a fixed sized subset of landmarks within the fingerprint. This is effectively the same overall mechanism, with a simple transposition of the point at which the landmark subset if identified.

In digital telephony, call connection signalling and audio stream commencement are not reliably synchronised, and there is no reliable mechanism to identify when, within the entire audio stream of a call, the reception of a recorded message begins. On some occasions audio may be received by telephony equipment before the connection signalling is received or before the audio can be switched to the audio's termination point. As such it is impossible to establish absolute time locations for audio stream landmarks.

This causes a problem for comparison of fingerprints between steams as the absolute location of a fingerprints landmarks may differ between calls terminating on the same voice mail. Indeed, an audio steam may arrive at the receiver before the connection signal, so the start of the stream may be truncated. This can be as much as a few hundred milliseconds. In such situations some audio is lost, and fingerprints from that audio section will not be derivable.

(Given this limitation) It is an aspect of the current invention that several fingerprints are captured for later comparison, and that they are derived from a series of points (for example) in the first second of audio from a recorded message. If early audio from the same message is truncated from subsequent calls and the first, or first few fingerprints are lost, then matches can be made on fingerprints derived from audio anywhere up to a second past the start of the message.

It has been stated that absolute location is not persistent over multiple transmissions of a calls audio steam, as call connection signalling and audio stream commencement are not reliably synchronised. However, the relative time between landmark features within the stream is persistent.

The lack of absolute time locations for landmarks causes another problem for fingerprint comparison. To identify message equivalence, matching must be done on fingerprints derived from a fixed size ordered sequence of landmarks. A genuine match will only occur when all the landmarks used to derive one fingerprint correspond to all the landmarks used to derive its match. As it is an ordered sequence so the first and all subsequent landmarks must correspond. A match will be only occur when an alignment between the sets of landmarks occurs.

One mechanism for establishing an aligned pair is to continuously and incrementally generate all possible fingerprints from the current call, and to compare them, as they are generated, with a set of previously captured fingerprints. This mechanism incrementally steps along the sequence of strong landmarks in the audio stream, using each landmark in turn as an origin for the set of landmarks from which to generate a comparison candidate fingerprint. An origin is any consistently designated element position within a fingerprint. As a single second of voice audio may contain around a 1000 landmarks, many hundreds of iterations might be needed to find a match, and 1000s of comparison operations will be wasted where no match is possible. Furthermore these wasted comparisons will be made against a set of 1000s of pre-captured fingerprints. The processing overhead is large.

Figure 4:
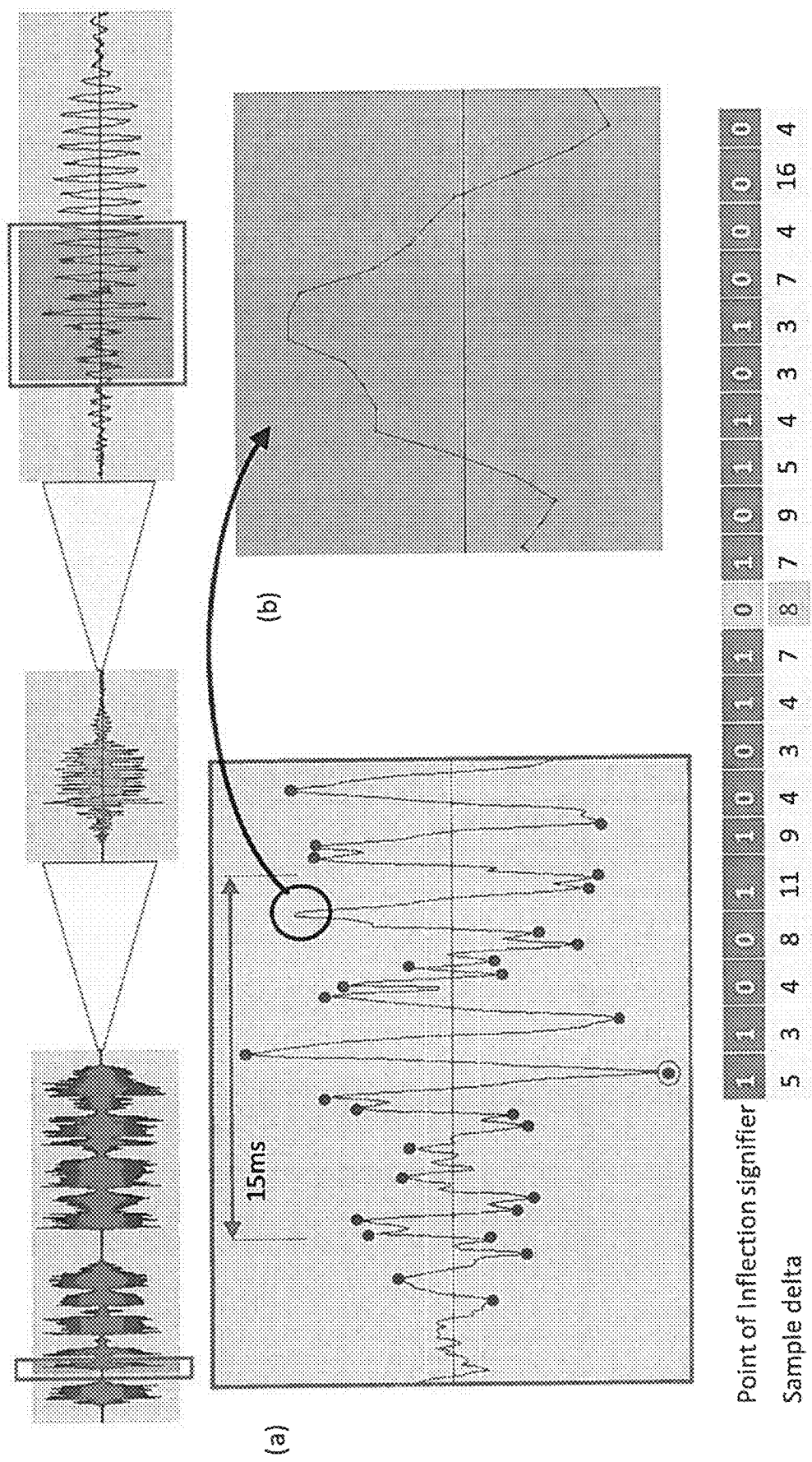
FIG. 4 shows the identification of particularly distinctive landmarks as with points of inflection in a data stream.

To reduce the number of fingerprint comparisons needed for a match, or wasted when no match is possible, this invention employs a mechanism to pre-align fingerprints. Preferred embodiments of the invention identify some "very strong" landmarks to be origins for fingerprints. Each fingerprint will have one of these landmarks as its origin. The mechanism will persistently identify the same set of origin landmarks within multiple receptions of the same recorded message, and so the set of fingerprints derived from each instance will have the same set of origins. This is explained further with reference to FIG. 4.

FIG. 4(a) shows a section of an audio stream with sample points defining the waveform. Solid dots are used to identify the points of inflection which are identified as strong landmark features. To identify an origin a particularly distinct peak or trough is required. This is identified by looking at the difference between amplitudes of adjacent landmark points. The data representing one form of a fingerprint is shown below FIG. 4(a). Each column represents data associated with one landmark. The top row is the signifier row, a 1 indicates a peak and a 0 indicates a trough. The bottom is the sample delta row which contains the delta between the landmark and the next landmark. This delta is held as a sample count. One other possible form is to take the deltas relative to the origin. The landmark shown by the lager double circle is identified as an origin. In this case it is the landmark with the greatest absolute sample value. In this example the origin is taken as the middle element of the fingerprint, however origin may be optionally set at any set location in the fingerprint. Comparisons can only be made between fingerprints with the origin at the same location FIG. 4(a) also shows that not all peaks and troughs are identified as landmarks. In FIG. 4(b) the sample data is expanded to show a weak landmark. This is one of a number within the example that do not have solid dots attached to them.

This process of origin location may be known as 'macro-landmarking' and finds the persistently distinct points of interest and designates one or more of these as origin alignment landmarks. Macro-landmarking is carried out on all instances of landmark fingerprinting. Thus, each set of landmark fingerprints generated from the same recorded message will have the same set of origin alignment landmark or landmarks irrespective of the location of the exact start time of sampling in a candidate audio stream from which the fingerprint is created. These origin alignment landmarks are then used to align fingerprint data for comparison.

Using fingerprint origin, every time a particular message is received the same fingerprint will be created at the same location in the message. Thus, if a stored fingerprint is associated with the recorded message carried by the current call, an identical fingerprint will be generated and will lead to a match with the stored fingerprint.

Using fingerprints that incorporate a very strong landmark as an origin ensures that matchable fingerprints will be pre-aligned. This means that any current audio stream need only generate one or two fingerprints in order to establish any potential match. The number of comparisons required before a match is found with a stored fingerprint is very small. Any unmatchable audio (e.g. from a live caller) will generate just a small number of fingerprints (typically between 5 and 15) requiring comparison, before the comparison cycle is abandoned and call is deemed "not known message". The computational resource required by the comparison cycle of un-aligned fingerprints is of the order of 100s of times greater than that of origin aligned fingerprints. Generating origin aligned fingerprints results in a substantial computational advantage.

It should be noted that this technique of original alignment is of benefit in situations when comparing array subsets of two or more array supersets. To this end it would also be of benefit in other environments that depend on digital set matching including other AMD mechanism.

Thus, the entire process of generating a fingerprint from an input data stream identifies landmark features in actual data making up the data stream and uses these to generate a fingerprint. The process can be summarised as: taking an input data stream and identifying instances of clearly defined value changes to identify potential landmark features at specific times in the data stream, and with specific values at those times; looking for clearly defined (strong) landmark features by identifying features which are particularly distinct such as strong peaks or troughs; identifying macro-landmarks within the set of landmarks on which to use as fingerprint origins; generating a fingerprint from these strong features as the data streams. The output fingerprint contains relative sample locations.

The landmark fingerprinting operation may be carried out across a large part of the audio signal to create more than one fingerprint, or across several distinct parts. Typically a fingerprint is generated from a section of 16 ms of audio, but can be generated from a section as small as 8 ms. A positive detection is usually made within 350 ms of the start of the media stream, but may be achieved within as little as 10 ms. If positive detection is possible, due to origin alignment a match will usually be made on the first candidate fingerprint.

Negative detection is determined as the lack of a positive detection within a certain period. This period can typically be set to 750 ms from the beginning of the media stream. This negative detection time is the maximum time a live callee has to wait before positive detection is abandoned and to then be connected to a live agent. At 750 ms a live callee will not be aware of the detection pause, and negative detection is usually complete before the live callee has finished their greeting. Within the 750 ms detection limit the algorithm may generate around 8 candidate fingerprints.

Embodiments of the invention also provide a library management system for storing landmark fingerprints for comparison. The skilled person will appreciate that such a method can be used for any database used for "fast" capture-compare operations.

The library management system is designed to hold both an automatically updated collection of fingerprints generated from default service provider messages, and from custom subscriber messages. The management system supports the unified storage of default service provider messages and custom subscriber messages without distinction.

Figure 5:
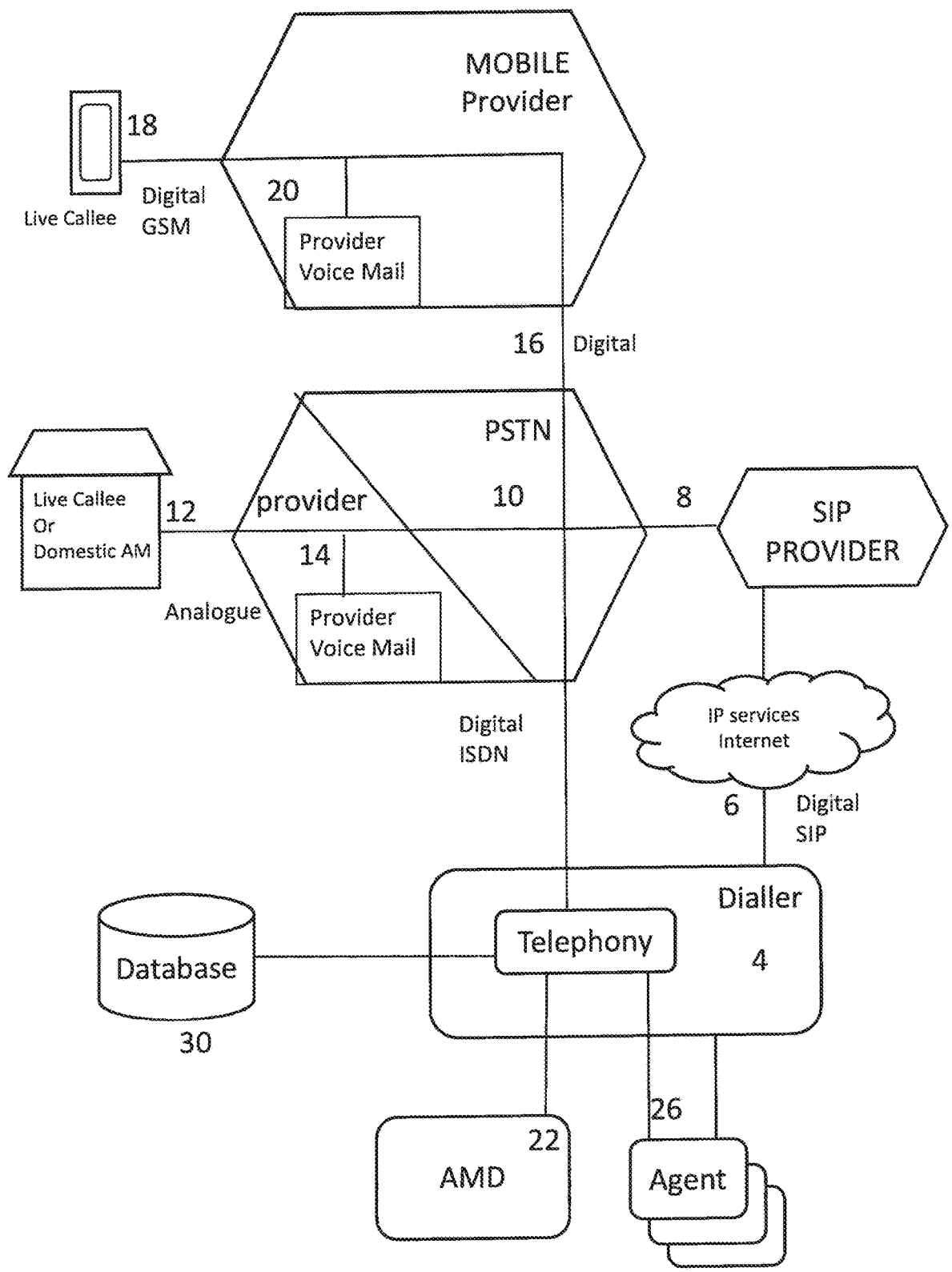
FIG. 5 is a schematic diagram of an automatic dialing system in which embodiments of the invention may be utilised.

FIG. 5 shows a schematic diagram of a system embodying the invention. This shows an automatic dialer system 4, which is connected to an answering machine detection unit 22 and to agents 26. The dialer 4 may retrieve numbers to call from a database of numbers at and make calls via Internet services 6 and an Internet provider to callers. Alternatively, it can dial over the ISDN network. Calls are routed by conventional PSTN exchange 10 to either a landline provider 14 and then to a live caller 12 or via a mobile provider 16 to a live caller 18. When a call initiated by the dialer 4 is answered, it is routed to the answering machine detection system 22 which analyses the audio stream received to generate fingerprints and using comparisons with fingerprint data stored in database 30 is able to determine whether or not the call has been answered by an answering machine or a live person. If the result is that the call has been answered by a live person, then the call is connected to an agent 26.

Figure 6:
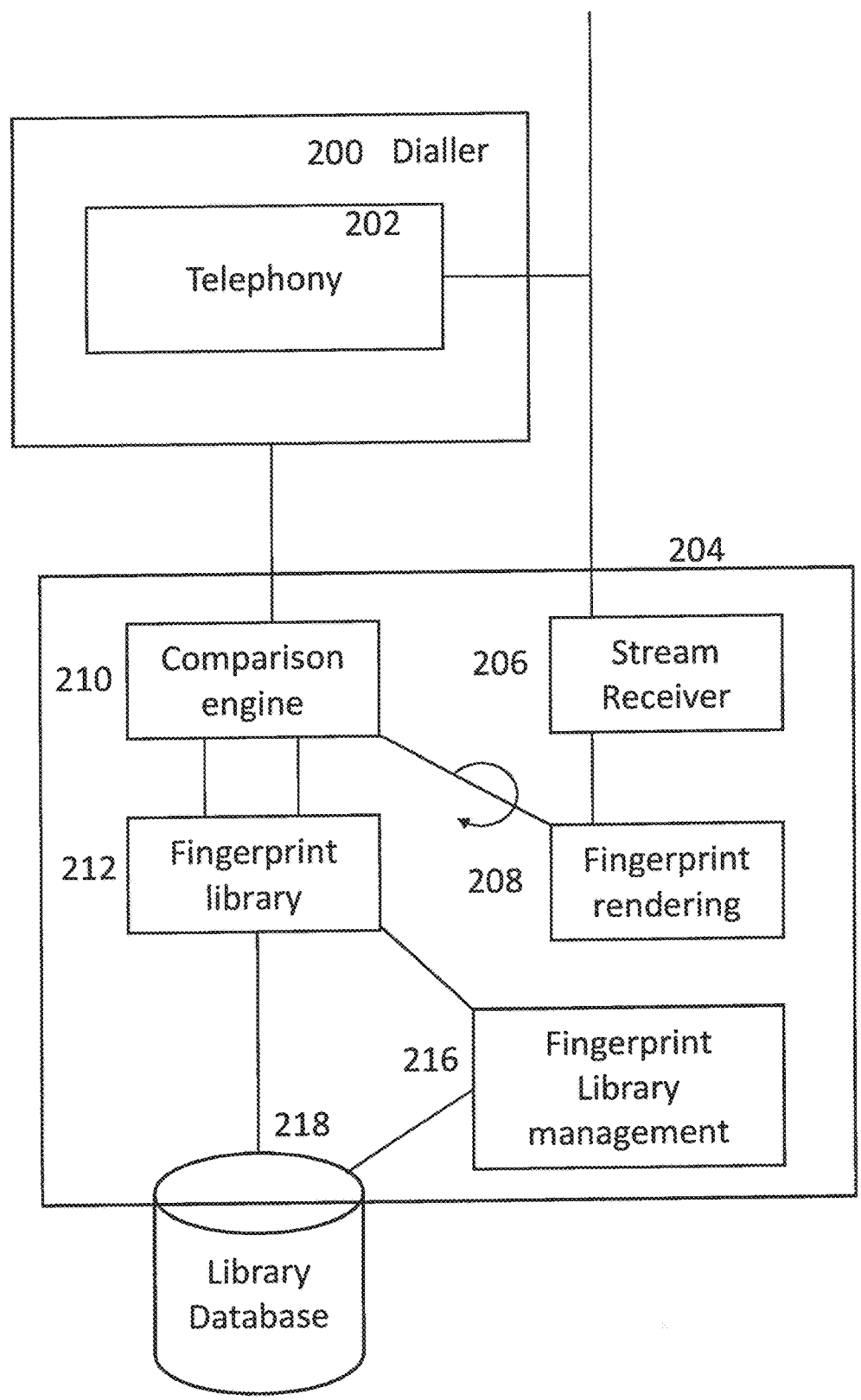
FIG. 6 is a block diagram of the answer machine detection system embodying the invention.

FIG. 6 shows more detail on the dialer and answering machine detection units referred to in FIG. 5 items 4 and 22. The dialer 200 includes a telephony unit 202 which initiates calls. When a call is answered by a callee or an answering machine, the call is routed to the answering machine detection system 204. This comprises a stream receiver 206 which processes the received audio stream into a form appropriate to the fingerprinting operation. This then passes to fingerprint rendering unit 208 which processes the output of the audio stream receiver to determine a set of landmarks in the received audio stream, and preferably further determines whether landmarks are strong landmarks. From this data, a fingerprint is derived as discussed above.

Immediately following generation, the fingerprint is then passed to a comparison engine 210 which compares it with one or more fingerprints from a fingerprint library 212. The fingerprint library is controlled by a fingerprint library management unit 216 which supplies stored fingerprints from a database 218 to fingerprint the fingerprint library 212 for the purposes of comparison. Once a match is found the system should signal this to the dialer 200 and any other supporting system. Optionally at this point further processing of the call stream may be stopped.

The fingerprint rendering unit 208 analyses the stream receiver 206. This output of the stream receiver comprises a set of discrete sample values, e.g., 100 samples for 20 milliseconds. This functional unit identifies suitable landmarks. These are then processed by the fingerprint rendering unit to generate landmarks and then a fingerprint from the landmarks as discussed above.

As discussed above, these landmark points can be sets of points with relative time stamps and an indication of amplitude direction. The invention is not restricted to points of inflection but may comprise other graphical landmarks based on relative values, first derivatives and second derivatives. Fingerprints contain with landmark time separation gaps or with numbers indicating the time separation gap or with relative time stamp. Those skilled in the art will be aware of the number of different possibilities which arise.

The thus rendered fingerprint is then sent to the comparison engine 210 and compared with one or more fingerprints from the fingerprint library 216. If a match is detected with a fingerprint from the fingerprint library, then it is determined that the callee is a recorded message and there is no need to transfer the call to an agent 26. Therefore, the call is terminated.

If there is no match with a fingerprint in the fingerprint library then it is determined that the callee is not a known recorded message and may be a live person and the call is connected to an agent 26 who can speak directly to the callee.

FIG. 7 shows schematically the audio data stream output by the stream receiver of FIG. 6 item 206. From this audio data stream a first layer of candidate landmarks comprising all the landmarks is extracted by the fingerprint rendering unit 208. Clearly this is a smaller data set than the full audio data stream.

The second parallel layer of processing on the first layer landmarks identifies macro-landmark origins which can be used as origins for the generated fingerprints. It will be appreciated that there is only a small processing and time cost associated with the initial fingerprint rendering of the audio data stream by fingerprint rendering unit 208. It can be achieved in a single pass of the data stream. Furthermore, the result of this fingerprint rendering is a small set of fingerprints aligned to strong landmark origins. This greatly reduces the required comparison iterations and therefore processing power output required by the comparison engine 10 when comparing a fingerprint with one or more stored fingerprints. If no match is found then the callee may be a live callee and the call is passed to an agent, or if no agent is available then the call may be terminated.

As far as the library of stored fingerprints is concerned, preferred embodiments of the present invention provide a single mechanism for automated maintenance of the library which enables the AMD to efficiently and effectively maintain a library that includes fingerprints based on an automatically updated collection of default provider messages and a set of custom subscriber messages. This mechanism is independent of the rendering of the fingerprints into the library, but it is enhanced by capture and comparison methods which are fast and efficient in terms of use of processing resources. While library management is functionally independent of fingerprint rendering and comparison cycles, the designed efficiency of the rendering and comparison stages has a tangible benefit to library management. With such a low processing overhead, especially in terms of comparison iterations, the library is able to maintain a much larger library than it could otherwise. This provides the advantage of being able to store custom subscriber messages, which are orders of magnitude more numerous than default provider messages. This in turn increases the accuracy of the AMD in terms of increasing the true positive detection ratio.

When a destination is called and a fingerprint is created from an incoming data stream, matching in the library is agnostic as to whether the incoming data stream relates to a custom or default message. If no match is detected the inference is that the call is connected to a live callee, an analogue recording or a digital recording not known to the library. However, despite the low probability that newly generated fingerprints are associated with digitally recorded message, they can be added to the library.

By adding new, unmatched fingerprints to the library without qualification, the library could soon grow to be unusably large. Therefore, the library management system deletes inappropriate or obsolete fingerprints. This is achieved by associating with each fingerprint a data attribute based on "time of addition to the library" and/or "time of last match". Using these, library maintenance can be performed to delete fingerprints which have not found a match within a predetermined period of time. Primarily this prevents fingerprints generated from unmatchable sources, such as live callers or analogue recordings, from persisting in the library. This will also enable custom messages to be deleted within a short period following their obsolescence.

Thus, frequently or multiply matched fingerprints, such as those derived from default provider messages, will remain in the library, while inactive ones will be culled. A lifetime threshold can be intelligently set so that any captured custom message fingerprints reside in the library for a short time only, but long enough to be present if the same destination is called within a predetermined short period. This utilises the fact that in dialer campaigns many calls may be made to the same number in a short period (a few days) until a live callee is reached. That number may then not be called again for several months or even years. By deleting unmatched fingerprints after a given period, or deleting matched fingerprints after a longer period, it allows custom subscriber message fingerprints to be retained for long enough to be applied to any subsequent call to the same number within the same campaign. However, any custom subscriber message which is added to the library through such calls will likely become obsolete soon after the campaign has ended and such fingerprints can be deleted even if they had been successfully matched to a subsequent call or calls. Using this approach, the library of fingerprints will be much more relevant to current calls and the detection rate of voice mail messages will be increased.

Those skilled in the art will appreciate that these embodiments described above can be implemented in dedicated hardware or in software or using a combination of the two. A skilled reader will also be aware that obvious variants to the terminology above fall within the scope of the invention claimed herein.

The invention claimed is:

1. A method of answering machine detection, comprising:

receiving an audio stream;

identifying a set of landmarks in a section of the audio stream, the set of landmarks being identified by identifying points of inflection in the audio stream by stepping through sample values making up the audio stream, comparing an amplitude of each sample value with an amplitude of at least an immediately adjacent sample value, and determining whether each sample value comprises a point of inflection and using one of more of the identified points of inflection as the landmarks;

identifying one or more persistent landmarks, any one of the persistent landmarks being identified by determining whether a difference in amplitude between a point of inflection in the audio stream and an immediately adjacent sample value exceeds a threshold and when the threshold is exceeded, identifying that point of inflection as a persistent landmark;

identifying ample values within the persistent landmarks that have absolute amplitude values greater than a sample value of a neighboring landmark and designating the identified sample values as origin landmarks;

deriving an audio fingerprint for the section of the audio stream from an array of sequential persistent landmarks in proximity to an origin landmark;

comparing the derived audio fingerprint with any one of a plurality of stored audio fingerprints by aligning a first origin landmark of the derived audio fingerprint with a second origin landmark of the stored audio fingerprint; and determining that the received audio stream is a recorded message of an answering machine if the derived audio fingerprint is substantially equivalent to one of the plurality of stored audio fingerprints.

2. The method according to claim 1, wherein deriving the audio fingerprint comprises identifying relative locations of the set of landmarks.

3. The method according to claim 2, wherein deriving the audio fingerprint further comprises identifying a value relating to each of the landmarks.

4. The method according to claim 1, further comprising adding the derived audio fingerprint to a database when there is no match with a stored audio fingerprint.

5. The method according to claim 4, further comprising deleting the derived audio fingerprint from the database when the derived audio fingerprint is not accessed after a predetermined period of time since the derived audio fingerprint was added to the database.

6. The method according to claim 1, further comprising deleting any one of the plurality of stored fingerprints from a database when the stored audio fingerprint is not matched after a predetermined period of time.

7. A non-transitory computer-readable medium storing one or more processor-executable instructions, which executed by at least one processor cause the at least one processor to perform the operations of:

receiving an audio stream;

identifying a set of landmarks in a section of the audio stream the set of landmarks being identified by identifying points of inflection in the audio stream by stepping through sample values making up the audio stream, comparing an amplitude of each sample value with an amplitude of at least an immediately adjacent sample value, and determining whether each sample value comprises a point of inflection and using one or more of the identified points of infection as the landmarks;

identifying one of more persistent landmarks, any one of the persistent landmarks being identified by determining whether a difference in amplitude between a point of inflection in the audio stream and an immediately adjacent sample value exceeds a threshold, and when the threshold is exceeded, identifying that point of inflection as a persistent landmark;

identifying sample values within the persistent landmarks that have absolute amplitude values greater than a sample value of a neighboring landmark and designating the identified sample values as origin landmarks;

deriving an audio fingerprint for the section of the audio stream from an array of sequential persistent landmarks in proximity to an origin landmark;

comparing the derived audio fingerprint with at least one of a plurality of stored audio fingerprints by aligning a first origin landmark of the derived audio fingerprint with a second origin landmark of the stored fingerprint; and determining that the received audio stream is a recorded message of an answering machine if the derived audio fingerprint is substantially equivalent to one of the plurality of stored audio fingerprints.

8. A system comprising:

a memory; and at least one processor operatively coupled to the memory, the at least one processor being configured to perform the operations of:

receiving an audio stream;

identifying a set of landmarks in a section of the audio stream the set of landmarks being identified by identifying points of inflection in the audio stream by stepping through sample values making up the audio stream, comparing an amplitude of each sample value with an amplitude of at least an immediately adjacent sample value, and determining whether each sample value comprises a point of inflection and using one or more of the identified points of inflection as the landmarks, identifying one or more persistent landmarks, any one of the persistent landmarks being identified by determining whether a difference in amplitude between a point of inflection in the audio stream and an immediately adjacent sample value exceeds a threshold, and when the threshold is exceeded, identifying that point of inflection as a persistent landmark, identifying sample values within the persistent landmarks that have absolute amplitude values greater than a sample value of a neighbouring landmark and designating the identified sample values as origin landmarks;

deriving an audio fingerprint for the section of the audio stream from an array of sequential persistent landmarks in proximity to an origin landmark;

comparing the derived audio fingerprint with at least one of a plurality of stored audio fingerprints by aligning a first origin landmark of the derived audio fingerprint with a second origin landmark of the stored fingerprint; and determining that the received audio stream is a recorded message of an answering machine if the derived audio fingerprint is substantially equivalent to one of the plurality of stored audio fingerprints.

* * * * *